UNITED STATES PATENT OFFICE.

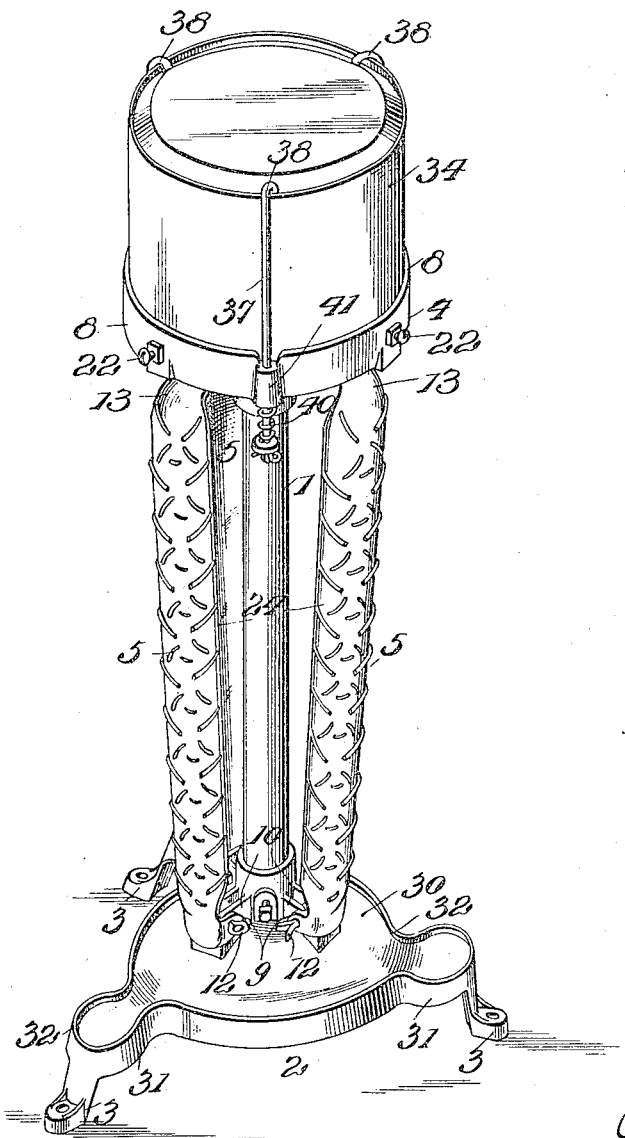

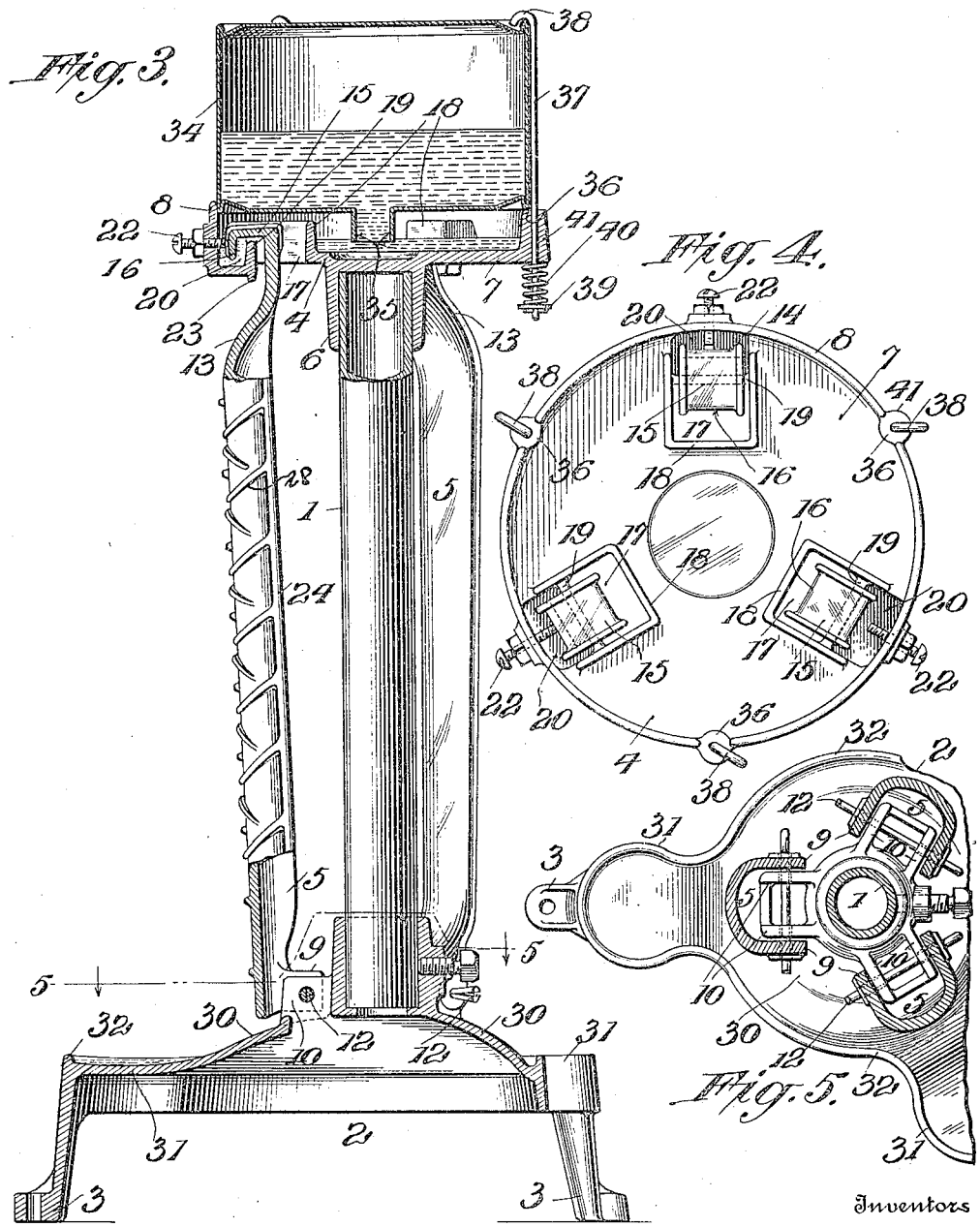

ARTHUR H. CONELLY AND THEODORE SCHELL, OF MACOMB, ILLINOIS, ASSIGNORS TO MACOMB SHEET METAL WORKS, OF MACOMB, ILLINOIS, A CORPORATION OF ILLINOIS.

HOG-OILER AND THE LIKE.

1,289,670. Specification of Letters Patent. Patented Dec. 31, 1918.

Application filed February 18, 1916, Serial No. 79,076. Renewed December 20, 1916. Serial No. 138,106.

*To all whom it may concern:*

Be it known that we, ARTHUR H. CONELLY and THEODORE SCHELL, citizens of the United States, residing at Macomb, in the county of McDonough and State of Illinois, have invented certain new and useful Improvements in and Relating to Hog-Oilers and the like, of which the following is a specification.

This invention relates to certain improvements in hog oilers and the like; and the objects and nature of the invention will be readily understood by those skilled in the art in the light of the following explanation of the accompanying drawings illustrating what we now believe to be the preferred embodiment or mechanical expression of the invention from among other forms, arrangements, and constructions within the spirit and scope thereof.

An object of the invention is to provide various improvements in hog oilers or analogous apparatus wherein the oil or other liquid to be applied to the animal flows down the outer surfaces of movable rubbing bars or plates against which the animal rubs and which bar is thereby moved to control means whereby the liquid is then automatically fed to the outer surface of the bar.

A further object of the invention is to provide an improved liquid distributing surface for rubbing bars or plates used for applying oil or other liquid to hogs or other animals, without regard to whether such bar or plate is movable, and without regard to what method or means may be employed for feeding oil or liquid to such surface, and whether or not such bar or plate is embodied in an apparatus of the type hereby disclosed.

A further object of the invention is to provide exceedingly simple, durable and efficient means for automatically supplying liquid to the rubbing bars of apparatus for applying liquid to animals when said bars are moved by the animal in rubbing against the same.

A further object of the invention is to provide improved means for maintaining a supply of liquid for feeding to the rubbing bars of apparatus for applying liquid to animals.

A further object of the invention is to provide certain improvements in construction and arrangements of parts for the production of a highly advantageous apparatus for applying liquid to animals.

The invention consists in certain novel features in construction and in combinations and arrangements as more fully and particularly set forth and specified hereinafter.

Referring to the accompanying drawings:

Figure 1, is a perspective of apparatus embodying the invention.

Fig. 2, is a detail front elevation of one of the rubbing bars, the bar being shown tilted forward on its lower end, whereby the true inclination of the ribs 28, does not appear as in Fig. 1.

Fig. 3, is a vertical longitudinal section of the apparatus.

Fig. 4, is a top plan of the top pan or receptacle with the reservoir removed.

Fig. 5, is a cross section on the line 5—5, Fig. 3.

In the particular rubbing post illustrated to show apparatus embodying the invention, we provide a strong rigid central vertical column or spindle 1, which can be anchored, fixed or supported at its lower end in any suitable manner or by any suitable means, although in the particular example illustrated, the lower end of this column is rigidly fixed to and rises from the central portion of a cast iron or other suitable material base 2, having equally spaced depending supporting feet or legs 3, adapted to rest on and be secured to a fixed support, such as a floor, or suitable anchoring devices that can be buried or driven in the ground to hold the apparatus to the ground or to the floor against bodily tilting or shifting under the pressure exerted by animals when rubbing against the apparatus.

The head 4, of the apparatus is supported by this column in an elevated position, and in the example illustrated, several rubbing and liquid applying members 5, depend from this head with their lower ends terminating over the top face of said base. Although the invention is not so limited, we show three equally-spaced vertically-disposed rubbing bars or members 5, spaced radially from the column and at their upper ends confined to and in the head and at their lower ends pivotally joined to and supported by the base.

The head 4, in this particular example (although the invention is not so limited) consists of a horizontal circular feed pan or comparatively shallow open-top receptacle formed by a single casting, having a central depending hub or socket 6, receiving and secured to the upper end of the column 1, so that the horizontal receptacle is rigid with the column, and is formed with a horizontal floor 7, and a surrounding imperforate vertical flange or wall 8.

This receptacle is adapted to contain liquid to be supplied to the outer surfaces of the rubbing bars for application to the animals contacting said bars.

The rubbing bars are loosely mounted so as to be swung or moved when the animals engage the same, and the upper ends of the bars and said receptacle are so formed that the movement of a bar will force liquid from the receptacle and cause deposit thereof on the bar in such manner that the liquid will travel down and spread on the outer surface of the bar and be transferred to the hide of the animal rubbing against and causing such operative movement of the bar.

In the present example, each bar consists of a longitudinally-elongated metal member, plate or bar which can be composed of a single casting, although we do not wish to so limit the invention. This bar is formed with a wide outer rubbing surface of extensive area, and this surface is preferably transversely convexed, and if so desired the bar can be of approximately U-shape, channel form or concavo-convex in cross section. The bar is preferably supported from its lower end through the medium of a hinge connection with the base to afford the upper end of the bar a comparatively extensive swinging movement. To this end, we show the lower rear corner of the bar formed with a pair of spaced rearwardly projecting transversely perforated ears 9, arranged at the outer vertical sides of a pair of vertical ears 10, rising from the central upper portion of the base and having perforations alined with the perforations of ears 9, to receive a horizontal transverse pivot pin or axis 12, by which the bar is supported and on which it swings toward and from or radially with respect to the central column 1.

The upper end portion of the bar is reduced or tapered upwardly in width with its front or outer side curving upwardly and rearwardly to form a downwardly and outwardly curving or bulging breast 13, immediately under the top head or receptacle 4, while the upper end or extremity of the bar forms an upwardly extending narrow hook or inverted L-shaped head or projection consisting of a narrow approximately flat vertical shank or neck 14 at its outer or front vertical face gradually merging downwardly into said breast and at its longitudinal vertical edges gradually merging downwardly into the flaring longitudinal edges of said tapered portion; a horizontal forwardly extending top portion 15, and a depending front end flange 16, parallel with, in front of and spaced forwardly a distance from the front face of said shank or neck 14.

Each rubbing bar is formed approximately as thus described, and the floor of the head or receptacle 4, is formed with similar vertical openings for the upward passage of said hook like upper ends of the bars, so that the horizontal forward projections 15, and the depending flanges 16, of the bars will be located and arranged in the receptacle and above the floor thereof.

Each said vertical opening 17, in said receptacle is spaced inwardly from the surrounding outer wall of the receptacle, and also a distance outwardly from the center of the receptacle, and is radially elongated to permit the hereinbefore described swinging movement of the upper ends of the bars. Each said opening is surrounded on three sides by an upwardly projecting flange or curb 18, extending above the liquid level in the receptacle and integral with the floor of the receptacle while the outer or front side of the space inclosed by said curb is open for the passage of the forward projection 15, of the rubbing bar head, and is closed to maintain a certain level of liquid in the tank by the transverse low dam or wall 19, rising at the front side of the opening and arranged transversely of and a slight distance below the horizontal portion 15 of the rubbing bar 5, and parallel with and between the depending end 16, of said head and the front face of the neck 14, thereof.

The floor of the receptacle is depressed between the surrounding outer wall and the dam or low curb 19, to form a pocket 20, closed at its inner side by dam 19. The curbs 18 extend on opposite sides of the pockets into proximity with the wall 8.

These pockets receive the depending ends or flanges 16, of the rubbing bar heads and provide an ample supply of liquid in which said ends operate as hereinafter set forth, the flanges loosely fitting the pockets to retard inflow of oil.

Each curb 18, and its lower portion or dam 19, forms an open well extending upwardly through the receptacle and holding back the liquid therein against flowing by gravity down through the well so long as the liquid in the receptacle maintains a certain level therein. Each well is radially elongated to permit back and forth swing of the rubbing bar head therein, and the hinge axis or pivot of each rubbing bar is so arranged that the center of gravity of the bar is always located outwardly beyond a vertical line between the hinge axis of the bar and the inner end wall of the well receiving the head of said bar, hence each bar always tends to maintain its outermost position away from the center column and always automatically swings or returns to said outermost position after being swung to its limit of inward movement and then released. The inner end or wall of the well limits the inward swing of the rubbing bar, while the outward swing of the bar can be limited by the outer end or wall (dam 19) of the well or by the outer surrounding wall of the receptacle, or an adjustable stop can be provided for this purpose. For instance, we show radially arranged set screws 22, longitudinally adjustable through the outer surrounding wall of the receptacle and having heads and lock nuts accessible at the exterior of said wall, to form adjustable stops for engagement with the outer ends of the heads of the rubbing bars, whereby the range of swing of each bar can be varied to increase or diminish the quantity of liquid splashed from the receptacle and through the well at each operative stroke of a bar, as hereinafter set forth.

The rubbing bars when in normal position are at their limits of forward swing with the depending ends 16, of their upper end heads at the outer end portions of the liquid pockets 20, and remote from the opposing dams 19, of the well curbs. When an animal presses against a rubbing bar, the bar is quickly swung or jerked back or inwardly thereby rapidly forcing the depending end 16, of the bar head rearwardly through the liquid in the pocket and driving said liquid toward the dam 19, and consequently forcing and splashing a quantity of said liquid rearwardly over said dam and into the well and against the inner surfaces of the head and onto the breast of the rubbing bar.

Each inward or rearward operative stroke or swing of a rubbing bar forces a quantity of liquid from the receptacle so that it will fall through the well onto the breast of the bar from which it distributes itself downwardly on the outer face or rubbing surface of said bar. Also, liquid deposited on the neck and horizontal portion of the head of the bar will spread along said surfaces and gradually reach and flow downwardly on the rubbing surface of the bar and this action may be constantly going on to a slight extent owing to the fact that the depending front end of the rubbing bar heads are constantly dipped into the liquid in the pockets in which they are located.

It will be noted that the breasts of the rubbing bars are located under the wells to receive all liquid falling therethrough and that these breasts are also located under the front edge walls or dams of the wells to catch all liquid dripping from the rear surfaces thereof and from the depending drip edges 23 at the under surface of the receptacle. The neck and body of each rubbing bar are provided throughout their opposite longitudinal edges with elevated ribs, beads or dams 24, to confine the liquid to the front surfaces thereof and to prevent the liquid flowing to the rear or inner surface thereof.

The front or outer face of each rubbing bar is also provided with series of ribs to provide the desired irregular rubbing surface and to cause uniform distribution of the downflowing liquid throughout said face. To this end, we provide the breast of each bar with a pair of transversely arranged downwardly inclined and converging ribs 25, to catch the liquid and direct the same toward the longitudinal center of the breast where it can flow downwardly through a channel between the inner lower ends of said ribs to a center longitudinal channel between the spaced upper inner ends of a pair of short downwardly diverging ribs 26, on the front face of the upper end of the bar immediately below the breast and into engagement with a short transverse center interrupting rib 27, located immediately below the said upper ends of ribs 26, and across said center longitudinal channel. The outer lower ends of the short diverging ribs 26, terminate a distance from the longitudinal edge dams 24, and provide side longitudinal channels for the downflow of liquid to the upper edges of a pair of long downwardly converging ribs 28, between the inner lower ends of which a center longitudinal channel is formed immediately below interrupting rib 27, and above a corresponding short interrupting rib 29. Similar pairs of long downwardly converging ribs 28, and intervening short downwardly diverging ribs with short interrupting ribs 29, are continued throughout the length of the outer face of each bar and cause a slow tortuous flow of the liquid and cause the same to spread uniformly over the entire outer surface of the bar which is a feature of importance and advantage in apparatus of this character.

The surplus liquid that finally reaches the lower ends of the bars, drops from the lower edges of the bars onto the upper surface of the base which is formed to catch and retain the same.

The base 2, is formed with a central or body portion having a downwardly and outwardly inclined upper surface 30, located below the lower ends of the rubbing bars, and with outwardly-projecting approximately horizontal extensions or arms 31, approximately radiating from said central or body portion. The feet or legs 3, preferably depend from the outer ends of these arms.

The entire top surface of the base (including said central portion and the arms or extensions) is surrounded by a continuous unbroken outer-edge upwardly-projecting flange or curb 32, to retain the liquid dropping from the rubbing bars and confine the same on the top surface of the base. The top surface of the base is so formed that liquid dropping from the rubbing bars is caught and caused to flow onto the top surfaces of the base extensions which form shallow top pans or pockets in which the liquid is retained. In the particular example illustrated, we provide three rubbing bars uniformly arranged around the center column, and also provide three equally-spaced base extensions 31, each arranged opposite and below a rubbing bar. A frame extension is thus arranged opposite and below each rubbing bar so that an animal when rubbing against a bar can also rub the under portion of the body across a frame extension and thus contact the liquid retained by the top portion of the base and said extension. The animals can easily straddle the base when rubbing against the bars and can thus have the anti-vermin or other liquid applied to extensive areas of their bodies.

In the example illustrated, the central or body portion of the base is approximately upwardly bulging or somewhat in the form of a truncated cone to cause the liquid deposited thereon to flow down and outwardly onto the extensions.

Any suitable means can be provided to supply liquid to the top head or receptacle 4, and to maintain liquid at the desired level therein, although in the example illustrated, we show a removable font or supply tank 34, for this purpose. The supply tank 34, is closed or air tight except for a short center discharging and filling nozzle or neck 35, depending from its bottom. The tank is adapted to be filled with liquid through said neck 35, while the tank is held in an inverted position. The tank is then reversed, while the neck is held closed by a finger, and quickly placed in the otherwise open top of the head 4, as the finger is removed. The neck will then depend from the bottom of the tank with its lower open end slightly spaced from the center of the floor of the head 4. The liquid will flow by gravity from the tank into the head until the liquid level in the head rises above the horizontal plane of the lower open end of the neck and thus seals the same against entrance of air to the interior of the tank. Whenever the liquid level in the head falls so as to expose the open end of the neck, air will be admitted to the tank and liquid will flow therefrom to maintain the desired liquid level in the head and again seal the neck against liquid feed.

Suitable means are provided to center and uphold the tank. For instance, the lower end of the tank is formed to fit down within the surrounding rim or flange 8, with the lower end of the tank abutting suitable elevated shoulders or ledges 36, formed in or of said rim and projecting inwardly from the inner surface thereof.

Any suitable means can be provided to detachably lock or clamp the tank to and in the head and against accidental displacement. For instance, we show vertically-movable and rotatable spring held tank locking or clamping rods or hook bolts for this purpose. Each bolt consists of an elongated straight shank or body 37, having a laterally bent upper end or hook 38, and a headed lower end 39, on which the lower end of a coiled expansion spring 40, is seated, the spring loosely and longitudinally encircling the lower end portion of the bolt shank. These bolts are confined to the head 4, through the medium of vertically perforated ears or bosses 41, integral with the rim 8, and projecting at the exterior thereof. If so desired, the inner upper corners of these ears can project beyond the inner surface of the rim to form the tank supporting stops or ledges 36.

The clamping bolts are rotatable and also longitudinally slidable in said ears 41, and when not in operative position clamping the tank to the head, said bolts are usually in inoperative dropped position with their upper clamping or hook ends engaging the upper ends of the ears and turned outwardly.

When the tank has been properly seated on the head and within the rim thereof and is ready to be clamped in operative position, each clamping bolt is pulled upwardly until its lateral upper end is above the level of the tank top and the spring 40, is compressed between the lower end of the boss and the bottom head of the bolt, whereupon the bolt is rotated to bring its upper lateral end over the tank top, and is then released. The springs 40, will then tightly hold the tank seated in the head 4, through the medium of the upper clamping ends 38, bearing down on the upper end of the tank.

The tank can be readily released, preparatory to removal and filling, by lifting each bolt and then rotating the same to project its end 38, outwardly, and then releasing the bolt so that it will drop clear of the tank.

It is evident that various changes, modifications and variations might be resorted to, that elements might be omitted, and that features might be added without departing from the spirit and scope of our invention, and hence we do not wish to limit ourselves to the exact disclosures hereof.

What we claim is:

1. An animal oiler including an oil container having a wall over which the liquid may flow, an upright rubbing member having its upper end turned outwardly above the front rubbing face of the member and over the wall of the container, the free end portion of said outwardly turned upper end being downturned into the liquid of the container for horizontal movement therein, and means supporting the rubbing members on a horizontal pivot.

2. An animal oiler including an oil container having a wall over which the liquid may flow, an upright rubbing member having its upper end turned outwardly above the front rubbing face of the member and over the wall of the container, the free end portion of said outwardly turned upper end being downturned into the liquid of the container for horizontal movement therein, means supporting the rubbing member on a horizontal pivot, and an adjustable screw engageable by the downturned end for varying its extent of movement in the liquid.

3. An animal oiler including an oil container having a wall over which the liquid may flow, an upright rubbing member having its upper end turned outwardly above the front rubbing face of the member and over the wall of the container, the free end portion of said outwardly turned upper end being downturned into the liquid of the container for horizontal movement therein, means supporting the rubbing member on a horizontal pivot, the underlying rubbing face being formed with a vertical series of centrally located, horizontal ribs, other ribs converging downwardly from each edge of the rubbing member and terminating in spaced relation beneath the adjacent horizontal ribs, and downwardly diverging ribs between relatively superposed converging ribs and spaced at each end therefrom.

4. An animal oiler including an oil container having a wall, and a rubbing member having an integral forwardly extending part overhanging the wall and formed into a comparatively wide thin web for operating horizontally in the container to force the liquid over the wall to drop therefrom directly onto the rubbing face of said member upon the animal-actuated movement of the rubbing member.

5. In an animal oiler, an oil container having a pocket, a movable element pivotally mounted below the pocket and having an integral portion depending into said pocket and adapted upon movement of said pocket element to force oil toward and over a wall of said pocket for delivery to the movable element; other walls of said pocket being so disposed as to retard an escape of the oil in other directions, thereby causing the said movement to force oil over the first named wall.

6. In an animal oiler, an oil container, and a movable element having an integral portion depending into the container below the level of the oil in the latter and movable substantially horizontally therein, said container having walls defining a pocket about the depending portion of the movable element as to make it easier for the oil to splash out of the container over a predetermined one of said walls than to emerge into other parts of the container, and means movably supporting the movable element for according a horizontal movement to the depending portion.

7. An animal oiler including an oil container, and an upright rubbing bar pivoted at its lower end on a horizontal pivot and having its upper end extended forwardly and downwardly into the container to provide a depending splashing element interlockingly engaged with the wall of said container.

8. An animal oiler including an oil container, an upright rubbing bar pivoted at its lower end on a horizontal pivot and having its upper end extended forwardly and downwardly into the container to provide a depending splashing element interlockingly engaged with the wall of said container, and means adjustable against the splashing element to vary the extent of swinging movement of the bar.

9. A rubbing post comprising a support, an upright rubbing bar having a longitudinally elongated transversely convexed front rubbing surface, a transverse supporting axis for said bar and arranged at the rear corner of the lower end thereof, said bar being freely swingable on said axis to carry its upper end inwardly and outwardly, said bar being normally maintained by gravity at its limit of outward movement, means at the upper end of the bar for limiting the outward swing thereof, and a liquid feed pan, the upper end of the bar projecting into said pan to force liquid therefrom for delivering to said front rubbing surface on the rearward swing of the bar.

10. A rubbing post comprising a support, a liquid receptacle carried thereby, a swingable upright rubbing bar at its upper end having a liquid forcing projection adapted to dip into the liquid in said receptacle and move laterally therein to force a quantity thereof from the receptacle and into engagement with a portion of the bar down which it can travel to the rubbing surface of the bar, on the animal-actuated operative movement of the bar, and means movably connecting the rubbing bar to the support for according a lateral movement to the liquid forcing projection in the receptacle.

11. A rubbing post comprising a support, a receptacle carried by the support and having a dam holding back the liquid in the receptacle, and an upright laterally movable rubbing bar having a rubbing surface down which liquid forced from said receptacle over said dam can flow, said bar provided with an upward extension projecting into said receptacle and adapted to move laterally in the liquid therein toward and from said dam as the bar is moved back and forth to force the liquid over the dam.

12. A rubbing post comprising a support, an upright rubbing bar carried by an axis on which the bar is swingable back and forth, said bar having an outer side rubbing surface, said bar normally assuming its limit of outward swing, and an elevated liquid receptacle carried by said support and formed with a vertical well extending therethrough, said bar having an upwardly extending projection extending through said well and provided with a depending portion in said receptacle and adapted to dip into liquid therein and to force liquid over the curb around said well for deposit on said bar to supply liquid to the rubbing surface of said bar.

13. A rubbing post comprising a support, an elevated liquid receptacle carried thereby, and an upright rubbing bar at its outer side having a liquid distributing and rubbing surface, said bar at its lower end being pivotally joined to and carried by said support and being swingable thereon, and at its upper end extending into the liquid in said receptacle, said receptacle and the upper end of the bar coöperating to constitute a force feed for supplying liquid to travel down said surface of the bar, said force feed being operated by the inward swing of the bar.

14. A rubbing post comprising a support, an elevated liquid receptacle carried thereby and having a well extending vertically therethrough and formed by an opening in the floor of the receptacle surrounded by an upwardly extending curb at one side reduced in height to form a dam, and a swingable upright rubbing bar carried by said support and having a reduced upper end projecting upwardly through said well and movable therein as the bar swings, said end having a lateral projection extending over said dam and into said receptacle and formed with a depending liquid-forcing portion adapted to move in the liquid toward and from said dam, substantially as described.

15. A hog oiler, or the like, comprising a support, an elevated receptacle carried thereby and having a well opening vertically therethrough, an upright laterally-movable rubbing bar at its outer side having a rubbing and liquid distributing surface and at its upper end having means extending upwardly through said well and depending into the liquid in said receptacle to force liquid from said receptacle and into said well for delivery onto said surface when said bar is moved laterally by the impact of an animal thereagainst, and an adjustable stop limiting the movement of said bar in one direction.

16. A hog oiler, or the like, comprising a support, an elevated liquid receptacle carried thereby and formed with a vertical opening extending therethrough surrounded by a curb to form a well, said curbing having a low wall forming a dam, the bottom of the receptacle forming a liquid pocket one vertical wall of which is formed by said dam, and an upright laterally movable rubbing bar carried by said support and at its upper end having a projection extending upwardly through said well and movable laterally therein and extended forwardly in said receptacle and over said dam and formed with a liquid forcing flange depending in said pocket and opposite said dam.

17. A hog oiler, or the like, comprising a rubbing bar having an upright longitudinal rubbing and liquid distributing surface of extensive area formed with longitudinal edge means to confine the liquid to said surface and with vertical series of pairs of downwardly converging long ribs spaced apart at their lower ends, intervening pairs of shorter downwardly diverging ribs spaced apart at their upper ends, and transversely arranged short central interrupting ribs.

18. A hog oiler, or the like, having a pan-like receptacle provided with a surrounding rim and a floor and exterior vertically perforated projections, a liquid supply font removably fitted down in said rim and being closed except for a bottom filling and discharge neck depending into the liquid in the receptacle, clamping bolts turnable in and vertically movable through said projections and provided with laterally extending upper ends to extend over the upper end of the font and hold the same in the receptacle and with springs at their lower ends, a support for said receptacle, and a rubbing bar receiving its liquid supply from said receptacle.

19. In an animal oiler the combination with means forming an oil pocket, of an imperforate movable rubbing bar formed with a laterally disposed portion and an oil splashing element depending from the outer end of said portion into said pocket, said laterally disposed portion positioned above the oil pocket and being of sufficient width to receive the oil splashed therefrom and deflect the same onto the bar.

20. In an animal oiler the combination with means forming an oil pocket and a dam therein having an upstanding surface, of an oil splashing element disposed in the pocket and having an upstanding surface opposed to and substantially paralleling that of said dam, and a movable rubbing bar connected to said element whereby the said surface of the element is oscillated directly toward that of the dam upon a direct animal-actuated movement of the rubbing bar.

21. In an animal oiler the combination with a rubbing bar mounted for lateral oscillation and having an outwardly exposed rubbing breast, of means forming an oil pocket positioned forwardly of the bar, an oil deflecting plate projecting forwardly of the bar above the pocket, and an oil splashing element depending from said plate into the pocket.

Signed

ARTHUR H. CONELLY.
THEODORE SCHELL.

Copies of this patent may be obtained for five cents each, by addressing the "Commissioner of Patents, Washington, D. C."